United States Patent [19]
Warkentine

[11] Patent Number: 5,586,426
[45] Date of Patent: Dec. 24, 1996

[54] SEMI-AUTOMATED HARVESTER

[76] Inventor: James P. Warkentine, 832 Atlanta Hwy., Cumming, Ga. 30130

[21] Appl. No.: 402,009

[22] Filed: Mar. 10, 1995

Related U.S. Application Data

[63] Continuation-in-part of Ser. No. 325,895, Oct. 18, 1994, abandoned.

[51] Int. Cl.$^6$ .......................... A01D 51/00; A01D 46/00
[52] U.S. Cl. ........................ 56/327.1; 56/328.1; 56/13.1
[58] Field of Search .............................. 56/328.1, 13.1, 56/327.1

[56]                References Cited

U.S. PATENT DOCUMENTS

| | | | |
|---|---|---|---|
| 2,835,098 | 5/1958 | Scheidenhlem | 56/327.1 |
| 3,331,197 | 7/1967 | O'Brien | 56/327.1 |
| 3,413,787 | 12/1968 | Antwerp et al. | 56/328.1 |
| 3,566,594 | 3/1971 | Ellis | 56/328.1 |
| 3,595,000 | 7/1971 | Recker | 56/328.1 |
| 3,696,596 | 10/1972 | Wegscheid | 56/327.1 |

Primary Examiner—Stephen J. Novosad
Attorney, Agent, or Firm—Clark G. Sullivan

[57]               ABSTRACT

A semi-automated harvester for collecting fruits or vegetables comprising a retractable boom pivotally and rotatably mounted to a collection vehicle for movement up and down and around the collection vehicle, and a conveyor system integral to the retractable boom for engaging fruit or vegetables by vacuum means and conveying the fruit or vegetables along the retractable boom to a collection point for release and consolidation.

9 Claims, 6 Drawing Sheets

Fig_2

Fig_3

Fig_4

Fig_5

SEMI-AUTOMATED HARVESTER

RELATED APPLICATIONS

This is a continuation in part application to my application Ser. No. 08/325,895, filed Oct. 18, 1994, now abandoned.

BACKGROUND OF THE INVENTION

This invention relates generally to the harvesting of fruits and vegetables and more particularly concerns the collection of heavy, ground-laden fruits and vegetables, such as melons, by mechanical means. Although this invention is intended to be used to harvest many heavy ground-laden fruits and vegetables, and I claim such harvesting as within the scope of the invention, I will discuss the invention generally with reference to the harvesting of melons. As mechanical harvesting has progressed with the times, allowing cheaper more efficient harvesting means, the collection and harvesting of melons has remained principally one of human toil and exertion. The use of mechanized vehicles and trucks in the fields, as the point of collection and consolidation for these melons, has reduced the labor required to harvest them. Because of several impediments to the harvesting of melons, including the random growth of the vines which support the melons, the ease with which melons are bruised and damaged, and the extent to which melons ripen at different times, manual labor, which stoops down, selectively picks up the melons and cuts the vine, and carries the melon to the truck for collection and consolidation, has in the past been the preferred method for harvesting melons among farmers.

Several inventions have attempted to mechanize the harvesting of melons with little success, due principally to their complexity and their inability to overcome the foregoing impediments. See, for instance, Scheidenhelm, U.S. Pat. No. 2,835,098 (issued May 20, 1958); O'Brien, U.S. Pat. No. 3,331,197 (issued Jul. 18, 1967), and Wegscheid, U.S. Pat. No. 3,696,596 (issued Oct. 10, 1972). Scheidenhelm discloses a harvester that utilizes rollers and travelling conveyors and which employs an elevating conveyor that is adapted to ride over the individual melons, and then to aid the rollers in lifting the melons until the melons can be elevated along smooth sloping surface for loading. The invention fails to achieve all the objectives of my invention because it harvests all melons in its path, even the ones not ripe. Moreover, because of the lack of human oversight the mechanical implements, when not operating at optimum efficiency, can destroy vines or damage the produce. O'Brien discloses a comparable invention that utilizes a conveyor that rides over the melons. O'Brien also discloses a method to influence the growth patterns of the melons, so that by manual oversight and manipulation the melons in a field can be segregated according to ripeness so that the melons can be selectively harvested. The invention fails to achieve all the objectives of my invention because the mechanical implements of the invention, when not operating at optimum efficiency, can destroy vines or damage the produce. Moreover, the invention requires a high degree of oversight of the melon growing process, and the corresponding undesirable consumption of a farmer's time. Wegscheid discloses a harvesting device comprising a plurality of individual melon harvesters supported along the length of a boom structure. Wegscheid's harvesting device does not achieve the objectives of my invention because it requires that a harvesting vehicle be substantially modified for mounting of the harvesting device. Moreover, the plurality of harvesters employed in Wegsheid's invention increases the likelihood for mechanical problems and downtime not present in a single harvester. Due to the described deficiencies in the prior art the harvesting of melons continues to be manually performed, with minimal mechanical innovation or utilization. None of the foregoing inventions has become accepted in the industry. I have invented a melon harvesting device that overcomes the weaknesses of the prior art.

It is a principal object of this invention to provide a harvesting device for melons which requires the services of fewer people than the hand harvesting methods generally practiced in the past.

Another principal object of this invention is to collect the melons over a wide range of directions and locations relative to a mobile collection vehicle.

A still further object of this invention is to provide a means and method for harvesting melons which will remove the melons at optimum ripeness and will not destroy or injure the vines or the melon.

Yet another object of this invention is to provide a harvesting device that is easily mounted to a collection vehicle without significant modifications to the collection vehicle.

Other objects and advantages of the invention will become apparent upon reading the following detailed description and upon reference to the drawings.

SUMMARY OF INVENTION

In accordance with the invention, the free end of a hydraulically assisted retractable boom, having its base end pivotally mounted to a collection vehicle, is manually maneuvered about a field of melons as the collection vehicle travels through a field. The construction of the boom permits an operator to maneuver the free end of the boom up and down, side to side, and to and from the collection vehicle. A collection and conveyance system is integral to the retractable boom. Individual melon engaging means are employed by the collection and conveyance system to engage melons through suction means. As individual melon engaging means are positioned at the free end of the boom, they are manually pushed against and engage the melon, whereupon the operator engages a switch that mobilizes the conveyor system, mechanically picks up the selected melon, and conveys the melon along the lower side of the retractable boom to the collection vehicle where the melon is deposited and manually consolidated with other melons. The melon engaging means then returns to the free end of the boom to engage another melon. A plurality of melon engaging means can operate in sequence or tandem to increase the capacity and efficiency of this invention.

In the drawings there are shown two embodiments of my invention. The first embodiment is illustrated in detail in FIGS. 1–6. This embodiment represents the preferred embodiment of my invention at the time of my prior application Ser. No. 08/325,895, now abandoned, to which this application is a continuation in part. Improvements have since been made to my invention, and these improvements are reflected in a second preferred embodiment shown in FIGS. 7–9.

While the invention will be described in connection with these preferred embodiments, it will be understood that it is not intended to limit the invention to those embodiments. On the contrary, it is intended to cover all alternatives, modifications and equivalents as may be included within the spirit and scope of the invention as defined by the appended claims. While melons are referred to herein as appropriate fruits or vegetables for use in the operation of the invention, and while such use has been practically carried into effect, other fruits and vegetables, particularly those of a related nature such as pumpkins, cantaloupe, or squash, can be similarly treated.

BRIEF DESCRIPTION OF THE DRAWINGS

With particular reference to the drawings:

FIG. 9 also represents a second embodiment of my invention.

DETAILED DESCRIPTION OF THE PREFERRED EMBODIMENTS OF THE INVENTION

First Preferred Embodiment

Figure 1:
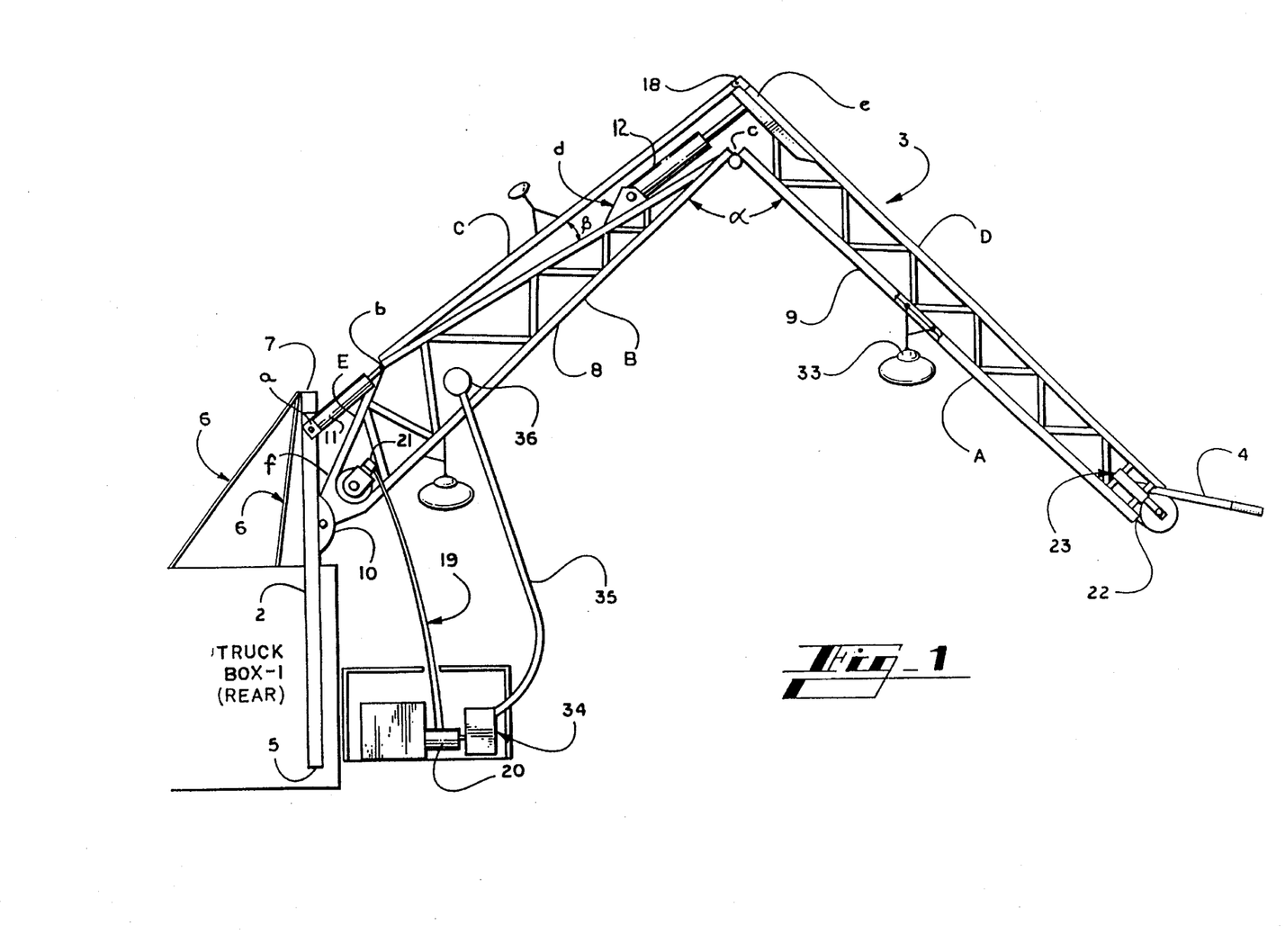
FIG. 1 is a side view of a first preferred embodiment of my invention showing the elements thereof in operative position in relation to an existing collection vehicle.

In the drawings in which like referenced characters designate like or similar parts throughout the various views, and with reference first to FIG. 1, there is shown a truckbed (1) supporting an upright pole (2), on which is mounted a boom structure (3) having a control lever (4) at its free end, with which an operator can maneuver the boom and operate the invention. A track for conveying melons, more particularly illustrated in FIGS. 2 and 4, circumferentially traverses the general exterior of the boom (3). The upright pole (2) is fixed by a mounting at (5) to the truckbed for axial rotation relative thereto, whereby the boom can be manually rotated about the truckbed. The mounting itself may be of any suitable conventional type, a detailed description thereof being unnecessary to the invention. The upper end of the upright pole is preferably supported by a plurality of cables (6) fixed at one end to the truck or truckbed, and mounted to the top of the rigid member as by a sleeve (7) fitted around the upright pole for axial rotation of the upright pole within the sleeve. Bearings can be employed within the sleeve to facilitate axial rotation when stress is applied to the upright pole.

In the first embodiment of the invention the boom structure is preferably composed of two boom sections, a base section (8) and a second boom section (9). The base section has its base end pivotally mounted to the upright pole as at hinge (10). A power cylinder assembly (11) is operatively connected between the upright pole as at point (a) and the base section as at point (b) for swinging the base section in a vertical plane. The second boom section is pivotally mounted at its base end to the free end of the base section, as at point (c). A second power cylinder (12) is operatively connected between the base section as at point (d) and the second boom section as at point (e) for swinging the second boom section relative to the base section about the pivotal connection, again in a vertical plane. Selective operation of the power cylinders serves to offset gravitational forces applied to the base section and the second boom section. This facilitates manipulation of the boom structure, by mechanically assisting an operator to change the angles of the boom sections relative to the upright pole and to each other. This enables an operator, with minimal effort, to move the free end of the boom up and down, and toward and away from a collection vehicle, for selective positioning relative to a melon to be harvested.

It is contemplated that an operator will manipulate the boom by means of the control lever (4) fixed to the free end of the boom. It is further contemplated that the operator will regulate the power cylinders by power regulating means located at the control lever. The power cylinders, and the power supply for the power cylinders, can be of any suitable conventional type, including pneumatic, hydraulic, or electronic. Hydraulic cylinders are shown in FIG. 1, along with a hydraulic motor (20) and at least one hydraulic line (19). While the hydraulic lines supplying hydraulic fluid and force to the power cylinders, the motor supplying hydraulic pressure to the hydraulic lines, and the means for regulating the hydraulic pressure supplied by the motor, have not been shown in detail, such remote control connections are well-known in the art.

Figure 2:
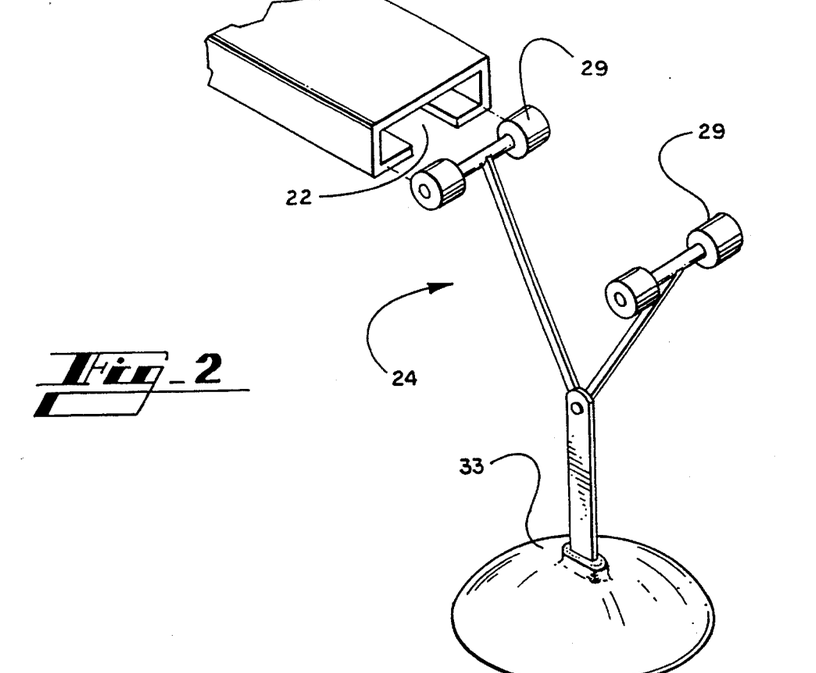
FIG. 2 is a cross sectional side elevation view of the track which is employed by a first embodiment of my invention to carry a melon conveying device, also shown, in accordance with the invention.
Figure 3:
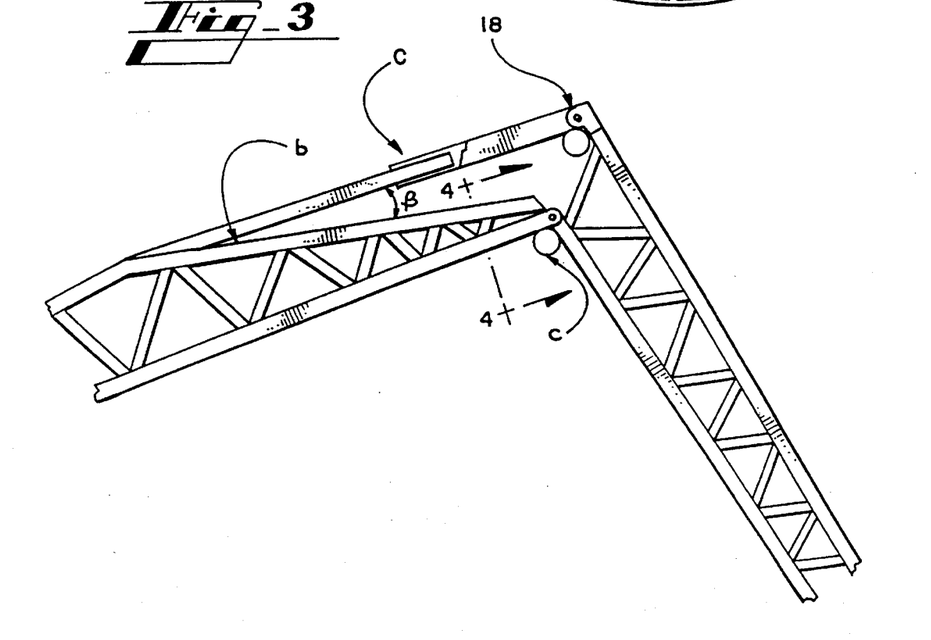
FIG. 3 is a side view showing in greater detail the operative relationship between boom sections employed in a first embodiment of my invention.
Figure 4:
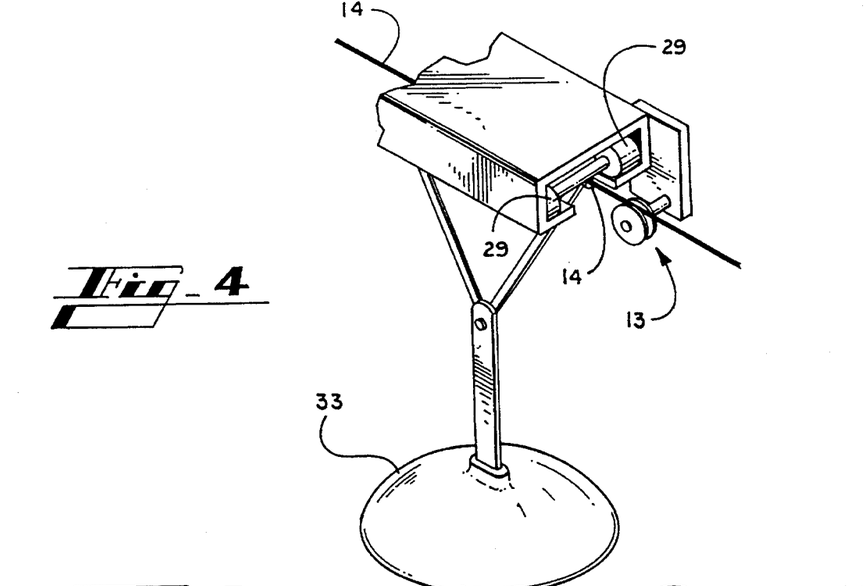
FIG. 4 is an end view of the pulley-cable interactive means of my invention which is used to transfer a loaded melon conveying device from one boom section to another in a first embodiment of my invention, what I term a reverse curve.
Figure 5:
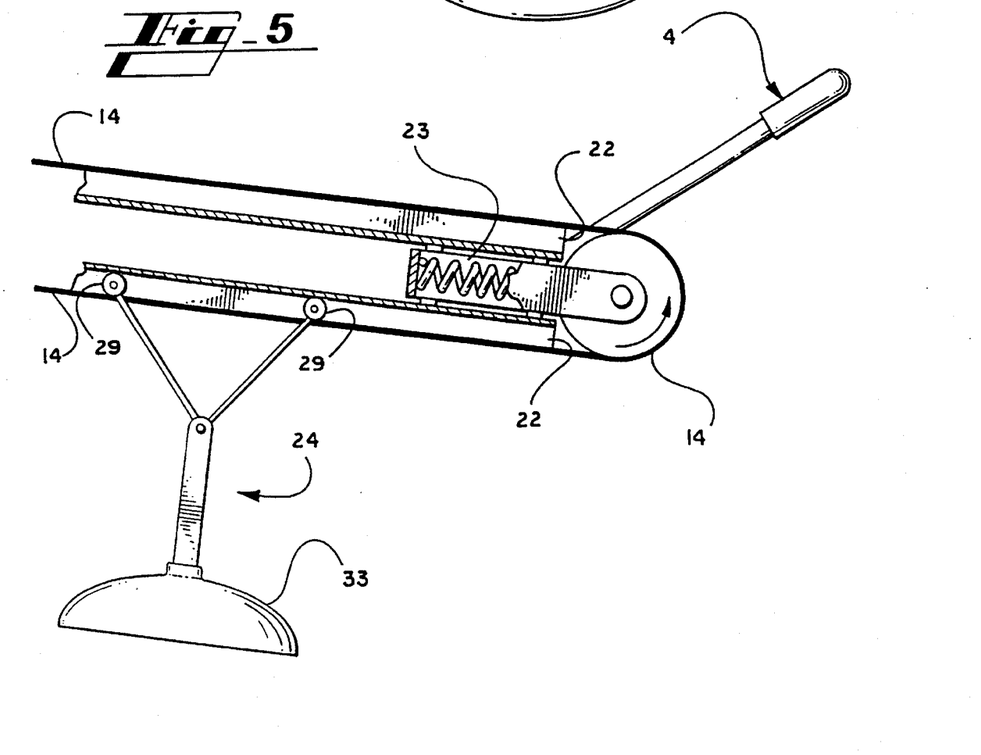
FIG. 5 is a side view of the free end of the boom employed in a first embodiment of my invention, showing how a melon conveying device is transferred from the upper side of the boom to the lower side, and how the cable that propels the melon conveying device is held taut.

Turning to FIG. 2, there is shown a cross-sectional view of the track that circumferentially traverses the general exterior of the boom structure. The track is composed of five disjointed sections, Sections A, B, C, D and E, each having the cross sectional structure illustrated in FIG. 2. Section A is integrated along and forms the structure of the lower side of the second boom section. Section B is integrated along and forms the structure of the lower side of the base section. Section D is integrated along and forms the structure of the upper side of the second boom section. Section C is mounted above the upper side of the base section linking points (b) and (e). A hinge (18) is employed at the connection between Section C and the second boom section that cooperates with the pivotable mount at (c). Because manipulation of the boom varies the angle (alpha) between boom sections at point (c), it is necessary for the length of Section C to vary according to the varying angle alpha between boom sections. For instance, as angle alpha increases the length of Section C must decrease. This objective is fulfilled, as illustrated in FIG. 3, by constructing Section C of two track sections of varying cross sectional area, so that one section is capable of sliding within the other. The variation of the length of Section C, and the variation of angle alpha, also requires that the angle (beta) at (b) be variable, which is accomplished by a pivotable mount at (b) hinging Section C to the upper side of the base section. A fifth section of track, Section E, is integrated along and forms the structure for a portion of the upper side of the base boom section, between points (f) and (b). Thus what is shown is a track composed of five disjointed sections that form a loop around the exterior of the boom, that is integrated with the boom structure, that is capable of movement in response to manual manipulation of the boom structure, and that will form and retain a loop around the boom structure during said manipulation. Other means for positioning and mounting the track for movement relative to the boom structure will become apparent to those skilled in the art, and this invention is meant to encompass all such positions and mounting means.

Figure 6:
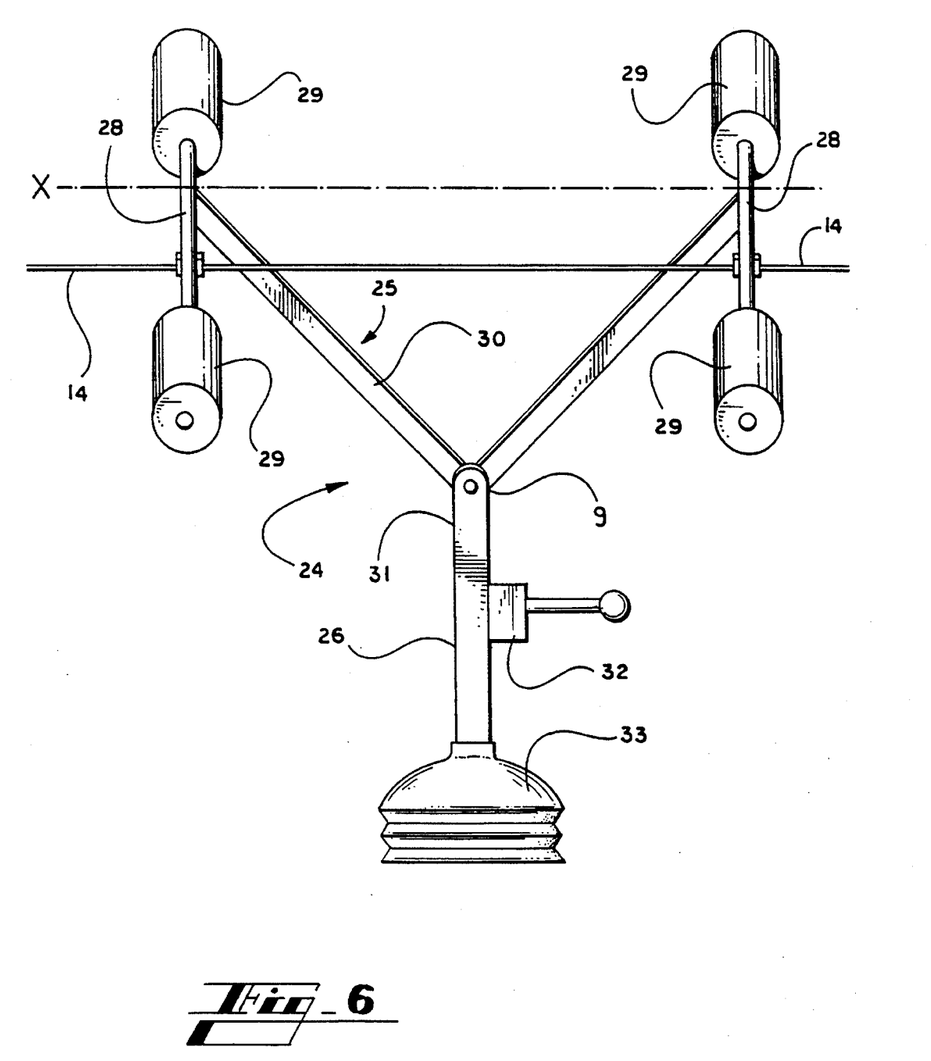
FIG. 6 is a side view showing in detail the operative components of the melon conveying device employed in a first embodiment of my invention.

The track is shown in FIG. 2 as a linear rectangular housing having an opening (22) along its length. The track is mounted to and integrated into the boom structure so that the opening (22) in the track projects away from the exterior circumference of the boom structure. The opening (22) permits the placement of a lift conveyor (24) in the track and the radial protrusion of the lift conveyor from the interior of the track, as illustrated in FIG. 2. The preferred embodiment of a lift conveyor (24) is shown in FIG. 6. Each lift conveyor is comprised of a cam follower (25) and a vacuum assisted melon engaging and lifting means (26) ("melon engaging means"), that are pivotally connected as at point (g). The pivotal connection is preferably a spring loaded hinge to reduce sway between the cam follower and the melon engaging means when the lift conveyor is under load. The cam follower (25) comprises two axles (28) of preferably equal length, bearing four track engaging wheels (29) at the end of the axles for rotatable motion about the axles. The axles and wheels are of suitable size and dimension to permit guided movement through the housing of the track, without interference from the opening along the track. The axles are fixed in parallel, rectilinear relation, by a V-shaped rod (30). Each free end of the V-shaped rod is mounted as by welding to an axle at an equidistant point along each axle, along axis X. The cam follower is placed into the track so that the V-shaped rod protrudes through the opening of the track, as more particularly illustrated in FIG. 2.

At the "V" juncture of the V-shaped rod there is pivotally mounted a melon engaging means (26). The melon engaging means comprises a linear member (31), a three-way valve (32) integrally mounted to the linear member, a hollowed passageway (not illustrated) extending through the length of the linear member in communicative relation with the three-way valve, and a suction cup (33) mounted to a first end of the linear member in communicative relation with the hollowed passageway. The melon engaging means is pivotally connected to the V-shaped rod at point (g) to a second end of the linear member (31). The hollowed passageway does not extend through the length of the linear member, but terminates at a point on the linear member (31) between the valve and the second end, to enable uninterrupted communication between one port in the valve and the suction cup. A vacuum is supplied to one port on the three-way valve. By actuating the three-way valve the vacuum communicates with the suction cup, creating a vacuum in the suction cup, and thereby assisting the engagement and lifting of a suitable melon. A third port on the three way valve opens to the atmosphere so that when the valve is opened to the atmosphere, the vacuum is released from the suction cup and the melon disengages.

The vacuum is supplied by a vacuum pump (34), vacuum hose (35), and vacuum lines of any suitable, conventional type. In this first embodiment of the invention there may be multiple vacuum lines, each corresponding to an individual melon engaging means. In order to prevent entanglement of these lines among each other or with the boom structure, these lines are preferably held tight and prevented from dangling by use of a spring loaded spool (36) or other device for retracting and consolidating each line as the melon engaging means circulates the track and moves toward and away from the retraction means.

One or more lift conveyors (24) are fixed to a cable (14), and are drawn by the cable through the track and around the entire circuit formed by the track. The cable circumferentially extends through the course of the track, itself forming a complete, closed loop within the track. According to the view of the invention in FIG. 1, the cable is drawn clockwise through the track by a motorized wheel (21). In FIG. 1 the motorized wheel is shown to be hydraulically driven, although other suitable, conventional driving means can be employed. Wheel 21 has a grooved surface along its exterior circumference that is positioned and aligned so the cable is continuously seated in the groove. The groove preferably has a rubber surface for effective communication of power from the motorized wheel to the cable. The cable is held tightly against the motorized wheel, for effective communication of power from the motorized wheel to the cable, by another wheel (22) located at the free end of the boom, pressed outwardly against the cable by a spring or power-assisted cylinder (23) of any suitable conventional design and type.

In practice an operator controls the movement of the boom, the action of the motorized wheel, and the actuation of the three-way valve, all from the end of the boom at the control lever (4). Recall that the cable is drawn clockwise around the boom according to the perspective given in FIG. 1. Because the free end of the boom is the point at which melons can most readily be engaged by the harvester, it is desirable to stop the circulation of the cable when a melon engaging head reaches the free end of the boom. As the cable is mechanically drawn through the track and a melon engaging means traverses the free end of the boom, to a point where the melon engaging means protrudes toward the ground, an electronic switch positioned at the free end of the boom structure is automatically activated causing the motorized wheel to cease operation, the cable to stop moving, and the lift conveyor to discontinue movement through the track. The electronic switch is not shown in the drawings because such switches are well known in the art. Once the melon engaging means has stopped the operator can manually activate the three-way valve for supply of vacuum to the suction cup, and manually position the boom for selective engagement by the suction cup of a melon. Once the melon has been engaged, the operator then switches on the motorized wheel causing the cable to resume its circulatory journey through the track, and the lift conveyor to pick up the melon thus engaged and carry it along the bottom side of the boom structure toward the collection vehicle. Beneath the base of the boom structure is a net. When a lift conveyor reaches the base of the boom structure an actuator trips the three-way valve causing the valve and suction cup to vent to the atmosphere, and the melon to disengage and fall into the net. The valve port opening to the vacuum is closed at the same instant the valve is opened to the atmosphere.

The electronic switches that activate and deactivate the electronic wheel, and the actuators that automatically trip the three-way valve, are of any suitable, conventional means, a detailed description thereof being unnecessary to the invention. Furthermore, other methods for controlling and actuating the three-way valve and the motorized wheel will become apparent to those skilled in the art, and this invention is meant to encompass all such methods.

It has been found that in operating the invention it becomes necessary to bridge the different track sections, to facilitate movement of the cam followers between the track sections. The movement of the lift conveyor from one section of track to another is facilitated by a series of four wheels. Sections A and B are bridged by a pulley which forms a reverse curve, shown more particularly in FIG. 4. The reverse curve comprises a pulley wheel (13) having a grooved surface along its exterior circumference. The wheel (13) is rotatably mounted between Sections A and B by any suitable conventional means. The wheel (13) is aligned and positioned so that the cable is continuously seated in the groove. The groove thus facilitates guided transfer of the cam follower wheels from Section A to Section B. As the cable is drawn over the wheel the V-shaped rod, and the melon engaging and lifting head, because they are aligned offsetting the cable, pass beside the wheel unobstructed. Stability is ensured as the cam follower moves between sections because an axle is always in a track section as the cam follower passes from one section to another.

Sections C and D are bridged by a wheel which is integrated into the hinge (18). This wheel has a grooved surface along its exterior circumference, and is positioned and aligned so that the cable is continuously seated in the groove as the cable is drawn through the track, thereby facilitating guided transfer of cam follower wheels from Sections C to D. Wheel 22 facilitates guided transfer of cam follower wheels from Sections D to A in the same manner. Sections B and E are similarly bridged by motorized wheel 21. Sections E and C are bridged simply by a hinge over which the cam followers readily pass.

Thus, it has been shown that a hydraulically assisted retractable boom can be manually operated to deploy the free end of the boom within a field of melons at variable locations. It has also been shown that a track can be integrated into the boom for guiding and carrying melon engaging and lifting means in a circulatory action around the boom, the melon engaging means being drawn through the track by a mechanically assisted cable. It is apparent that there has been provided, in accordance with the invention, a first embodiment of a semi-automated harvester that fully satisfies the objects, aims, and advantages set forth above. While the invention has been described in conjunction with a first specific embodiment thereof, it is evident that many alternatives, modification, and variations will be apparent to those skilled in the art in light of the foregoing description. Accordingly, it is intended to embrace all such alternatives, modifications, and variations as fall within the spirit and broad scope of the appended claims.

Second Preferred Embodiment

Figure 7:
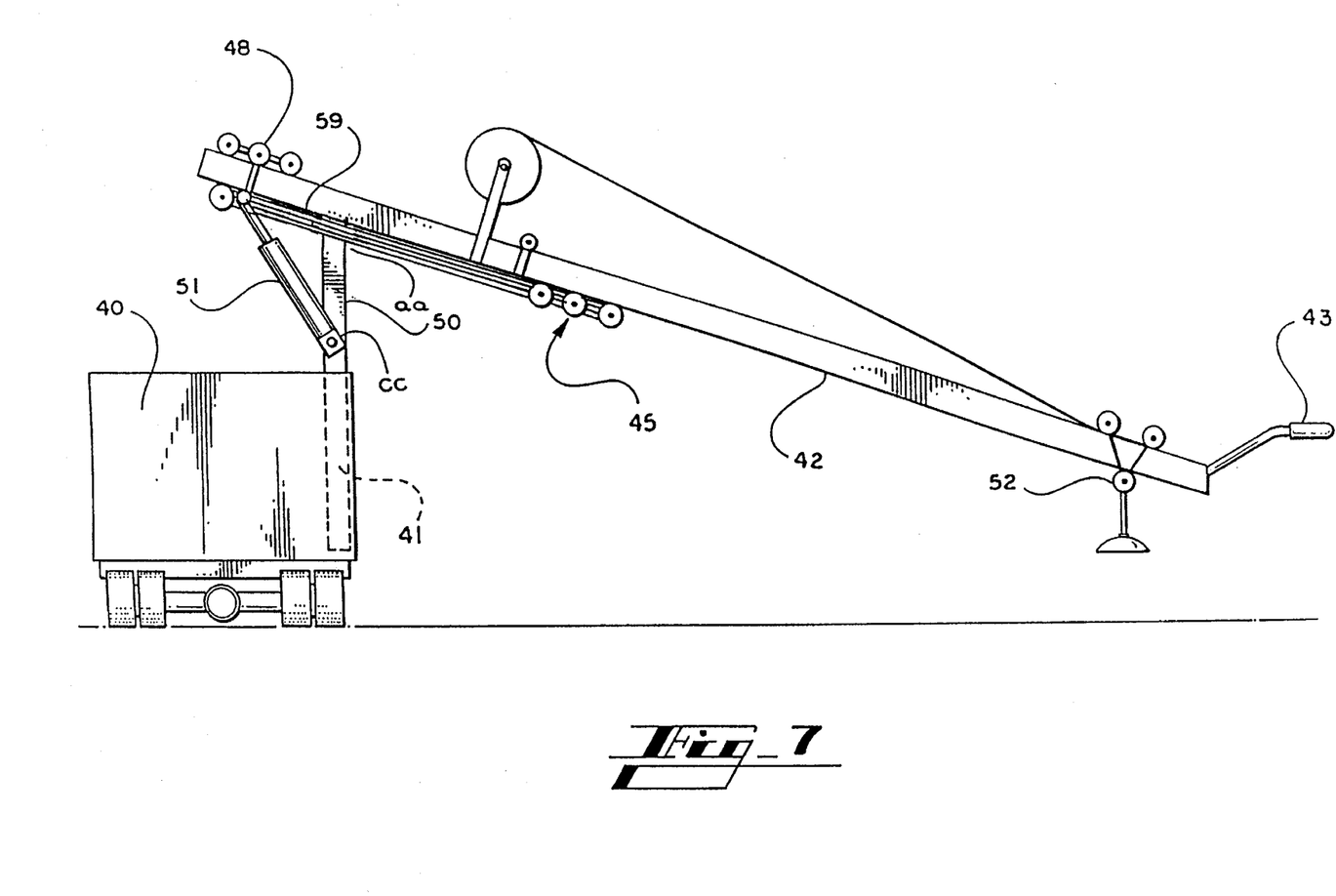
FIG. 7 is a side view of a second embodiment of my invention showing the elements thereof in operative position in relation to an existing collection vehicle.

In the drawings for the second preferred embodiment of my invention in which like referenced characters designate like or similar parts throughout the various views, and with reference first to FIG. 7, there is shown a truckbed (40) supporting an upright pole (41), on which is pivotally and slidably mounted, at point (aa), a linear boom structure (42) having a control handle (43) at its free end with which an operator can manually maneuver the boom and operate the invention. It will be shown that the pivotable and slidable mount at (aa) permits movement of the free end of the boom in all directions relative to the collection vehicle. The free end of the boom can thus be moved toward and away from the collection vehicle, up and down, and around the collection vehicle to a desired location. Because the invention contemplates that melons will be engaged, lifted, and harvested initially at the free end of the boom, the slidable and pivotable features of the mount facilitate harvesting of melons randomly located in a field relative to the collection vehicle.

Figures 8, 9:
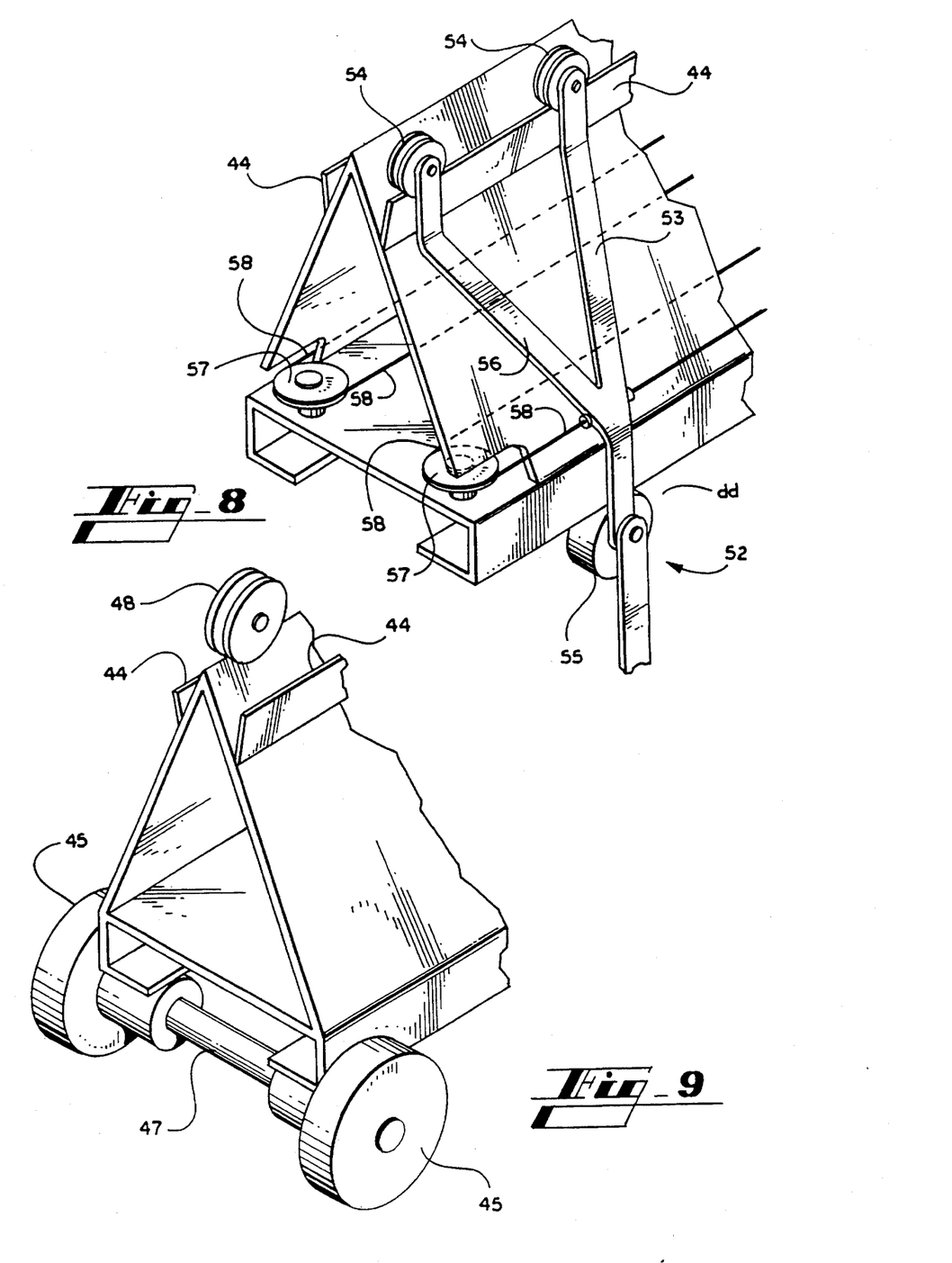
FIG. 8 is a side elevation view in cross section of a boom employed in a second embodiment of my invention, and the melon conveying device in operative relation to the boom.
FIG. 9 is an end view in cross section of the housing in which the boom slides, showing the boom in operative relation thereto.

In FIGS. 7 and 9 there is shown a preferred embodiment of the invention that identifies how the mount and boom could interact to produce the pivotable and slidable feature identified above. In FIG. 7 there is shown a side view of the boom structure extending longitudinally through the housing of the mount. A cross sectional view of the boom and the housing, given in FIG. 9, illustrate how the boom achieves slidable movement through and within the housing. The boom in cross section is preferably formed as an isosceles triangle having two lips (44), one lip protruding from each of the two equidistant sides of the triangle. The boom is seated and fixed for longitudinal movement with minimal play by a housing which comprises three sets of bearings mounted longitudinally to form, in a cross section perpendicular to the longitudinal axis, a triangle. Each set of bearings thereby corresponds to and guides a corner of the triangular boom as it slides in and out of the housing.

The three sets of bearings are mounted to a frame (59) that is pivotably mounted, as by a hinge, at point (aa) to the upright pole. The two lower sets of bearings (45) are shown in FIG. 10 to be shaped as a "T", mounted to the frame (59) in diametrical opposition. For optimal strength the two sets of T bearings can be mounted to one another by any suitable means, including by use of axles (47) extending through the bearings. The two sets of T bearings are spaced sufficiently apart in parallel relation to permit placement of the lower side of the boom on the bearings with minimal lateral play. Because each set of T bearings corresponds to a lower corner of the triangular cross section of the boom, this configuration of T bearings facilitates guided movement of the boom over the bearings and in parallel relation thereto. It should be pointed out that the bearings need not be evenly spaced along the longitudinal axis of the housing. Rather, because the greatest stress to the bearings will likely occur most often on the end of the housing which corresponds to the free end of the boom (the first end) a greater number of T bearings should be employed at first end of the housing than the opposite end of the housing (the second end) if one desires to reduce the number of bearings required to be employed in the housing. A sample bearing configuration is indicated in FIG. 7. The number of bearings used will depend on the load capacity of the bearings and the load to be applied to the bearings by the boom and any melons harvested by the invention.

A third set of bearings (48) corresponds to the upper corner of the cross section of the boom. These bearings are mounted above the boom to prevent vertical movement and lateral play of the boom in relation to the housing or when a melon is lifted at the free end of the boom. Were these bearings (48) not employed the boom could tilt out of its seat in the T-bearings when the gravitational center of the boom did not correspond to the midpoint of the support provided by the, T bearings, as when the boom is slid through the housing. The upper set of bearings are shaped as wheels having grooved surfaces around their circumference ("wheeled bearings"). The wheeled bearings are mounted to the frame (59) so that when the boom is slid into the housing formed by the frame and bearings the grooved circumferential surfaces of the wheels straddle the top corner of the cross section of the boom, thus restraining upward forces applied by the weight of the boom. The straddle effect also minimizes lateral play around the top corner of the boom, and further secures the firmly guided movement of the boom longitudinally through the housing. For reasons apparent from the foregoing discussion, the wheeled bearings are not necessarily evenly spaced along the longitudinal axis of the housing, as can be seen in FIG. 7.

Thus it has been shown that the housing and bearing assembly guides and supports a triangular boom as an operator slides the boom longitudinally through the housing. At the same time the housing and bearing assembly restrains and offsets opposing forces applied by the boom to the bearings as the boom is operated. The operator is thereby able to maneuver the free end of the boom toward and away from the collection vehicle. It will become apparent to those skilled in the art that alternative boom shapes and housing assemblies can be constructed to achieve the slidable feature, and this invention is intended to encompass all such alternatives.

The frame (59) for the housing assembly to the upright pole is pivotably mounted at point (aa) so that the free end of the boom (42) can be manipulated up and down and around the collection vehicle. The frame is hinged at two points—once to a cupped sleeve (50) that slides over upright pole (41), and again to a hydraulic cylinder (51) which in turn is hinged to the cupped sleeve (50) at point (cc). The cupped sleeve (50) is a rigid, hollow cylindrical member having one closed end. The sleeve is sized to slide snugly over the top of the upright pole (41) with minimal lateral play. Bearings are preferably integrated into the sleeve or the upright pole to facilitate rotation of the sleeve around the upright pole when the sleeve is under load. At the closed end of the sleeve there is mounted a hinge to which the frame and bearing housing assembly is mounted. At point (cc) along the sleeve there is mounted another hinge to which the hydraulic cylinder (51) is mounted. When the hydraulic cylinder is activated it serves to pull the housing assembly toward it, thereby counteracting gravitational forces applied to the length of the boom as the boom extends from the collection vehicle. Appropriately controlled, the hydraulic cylinder can thereby reduce the manual effort needed to move the free end of the boom up and down. Because the effort needed to lift the free end of the boom varies depending on (1) how far the boom is extended, and (2) the load applied to the boom, it is desirable to adjust the pressure within the hydraulic cylinder as the invention is operated. The second preferred embodiment of my invention therefore incorporates, in the handle (43) at the free end of the boom, a control to manually adjust the pressure in the hydraulic cylinder. In addition, a sensor can be employed at the base of the handle to automatically control the pressure of the hydraulic cylinder, to add pressure to the cylinder when the free end of the boom is lifted, and to reduce pressure in the cylinder when the free end of the boom is pushed down.

At least one melon engaging means and conveying device ("conveying device") is employed by the second embodiment of my invention to convey melons along the length of the boom to the collection vehicle. The preferred design of a conveying device (52) is shown in FIG. 8, and is very similar to the lift conveyor employed by the first embodiment of my invention. The conveying device (52) incorporates the same melon engaging means employed by the first embodiment of my invention. A description of structure and operation of the melon engaging means therefore need not be repeated. The melon engaging means is hinged in the second embodiment of my invention to what I term a trolley (53) at point dd. The hinge is preferably spring loaded to reduce sway of the melon engaging means under load. The trolley is similar to the cam follower employed in the first embodiment of my invention, comprised of a V-shaped rod (56) having three rollers. Two of the rollers (54) are shaped as wheels having grooves along their exterior circumference ("grooved wheels"). These grooved wheels (54) are mounted to the free ends of the V-shaped rod for rotational movement relative thereto. A third wheel (55) is mounted to the rod (56) at the V-juncture, also for rotational movement. The dimensions of the V-shaped rod correspond to the dimensions of the boom, so that when the grooved wheels (54) are seated on either of lips (44), the third wheel corresponds to and presses against the lower corner of the boom. This configuration allows the weight of the conveying device to be supported by the lip and the grooved wheels, and prevents frictional contact between the boom and the trolley that would otherwise occur at the lower corner of the boom without the third wheel.

The conveying devices are preferably propelled along the boom by means of a continuous cable (58). A portion of the cable is shown in operative relation to the trolley and the boom as in FIG. 8. The cable forms a continuous loop, running through the interior length of the boom, and along the exterior length of the boom. The cable is guided for its transition from the exterior of the boom to the interior of the boom by a grooved wheel (57) at each end of the boom. A reversible motor of any suitable power source is employed to draw the cable in two directions, so that the conveying device can be propelled in both directions along the length of the boom. The motor is not important to the invention and accordingly has not been shown. When the melon engaging means is deployed at the free end of the boom, and the operator of the invention has engaged a melon by activating the vacuum to the melon engaging means and pressing it against a melon, the operator then activates the motor which draws the cable and the trolley toward the collection vehicle. When the trolley reaches a designated point in relation to the collection vehicle and frame assembly (59), an activating device mounted to the frame releases the melon from the melon engaging means and reverses the motor and the course of the cable so that the trolley returns to the free end of the boom, where another remotely mounted activating device stops the motor, leaving the melon engaging means in position to engage another melon. A conveying device can be deployed on the other side of the boom in similar fashion to increase the capacity of the boom. Capacity can also be increased by employing more than one conveying device on each lip.

It is observed that the motor employed to draw the cable can be of electrical, pneumatic, hydraulic, or any other suitable means. It is further observed that other trolley propulsion means could be employed to effect the movement of the trolley in accordance with the invention. It is also observed that other melon conveying devices could be employed, and other boom structures could be constructed, that could enable conveyance of melons along the boom in accordance with the invention. While the invention has been described in conjunction with a second specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method for harvesting fruits and vegetables comprising the following steps:

(a) mounting the base end of a boom to a collection vehicle;

(b) deploying the free end of the boom directly toward, away from, or around the collection vehicle in a field of fruits or vegetables to be harvested;

(c) providing a conveying device connected to the boom;

(d) collecting at least one fruit or vegetable with the conveying device;

(e) propelling the conveying device along the boom to a collection point on the collection vehicle where the fruit or vegetable is released; and (f) returning the conveying device to the free end of the boom for collecting another fruit or vegetable.

2. A device for harvesting articles of fruit or vegetables comprising:

a collection vehicle;

a boom having a base end and a free end, the base end pivotally and rotatably mounted to the collection vehicle, and wherein the free end of the boom is capable of movement toward and away from the collection vehicle;

a track integrally mounted to the boom;

one or more article engaging and lifting means held to and supported by the track for guided movement relative thereto, capable of engaging and lifting articles when positioned at the free end of the boom;

a means for propelling the article engaging and lifting means along the track, thereby conveying articles held by the article engaging and lifting means along the track to the collection vehicle, and returning the article engaging and lifting means to the free end of the track for continual harvesting of articles; and a means for disengaging articles held by the article engaging and lifting means when the article engaging and lifting means reach the collection vehicle.

3. A device as in claim 2 wherein the boom comprises a base member and a free member joined at a pivotal connection, operatively connected by a mechanism capable of swinging the free member relative to the base member about the pivotal connection; an upright pole is mounted to the collection vehicle; and the base member is joined at a pivotal connection to the upright pole and operatively connected to the upright pole by a mechanism capable of swinging the base member relative to the upright pole about the pivotal connection.

4. A device as in claim 2 wherein the track circumferentially traverses generally the exterior of the boom, and being comprised of four sections corresponding to top and bottom sides of the base and free members; the four track sections are bridged by wheels rotatably mounted to the boom; the track comprising a length of casing having a linear opening throughout its length; the track being mounted such that the linear opening projects away from the boom in a vertical plane; the article engaging and lifting means are each pivotally connected by a rod that protrudes through the linear opening of the casing to rolling devices attached inside the track through the casing; the rolling devices being advanced around the track through the casing by mechanical means of fixed to the rolling devices.

5. A device as in claim 4 wherein the mechanical means comprises a circulating cable attached to the article engaging and lifting means, drawn by a motor through the length of the track.

6. A device as in claim 2 wherein the boom comprises a linear member having an upright pole mounted at one end to the collection vehicle, and to which at a second end is mounted a frame and bearing assembly whereby the boom is attached and through which the boom is capable of sliding motion.

7. A device as in claim 5 wherein the track comprises a lip that protrudes continuously along the length of the boom; the one or more article engaging and lifting means are supported by the lip, and propelled along the length of the boom until reaching a set point, such that contact with the frame and bearing assembly is prevented, whereupon an actuating mechanism attached in fixed relation to the frame stops the article engaging and lifting means and reverses its course, to return the article engaging and lifting means to the free end of the boom.

8. A device as in claim 6 wherein the article engaging and lifting means is propelled by a cable in moveable connection with a reversible motor, whereby the cable circulates between the article engaging and lifting means and the motor.

9. A device as in claim 2 wherein the article engaging and lifting means incorporate heads that are actually assisted by a vacuum means.

* * * * *